United States Patent
Karroumi et al.

(10) Patent No.: US 8,265,271 B2
(45) Date of Patent: Sep. 11, 2012

(54) METHOD AND DEVICE FOR MANAGING A TRANSMISSION OF KEYS

(75) Inventors: Mohamed Karroumi, Rennes (FR); Stephane Onno, Saint Gregoire (FR); Alain Durand, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 279 days.

(21) Appl. No.: 12/312,318

(22) PCT Filed: Nov. 6, 2007

(86) PCT No.: PCT/EP2007/061934
§ 371 (c)(1),
(2), (4) Date: Jan. 14, 2010

(87) PCT Pub. No.: WO2008/055900
PCT Pub. Date: May 15, 2008

(65) Prior Publication Data
US 2010/0128873 A1 May 27, 2010

(30) Foreign Application Priority Data
Nov. 9, 2006 (EP) .................................. 06301141

(51) Int. Cl.
*H04L 9/00* (2006.01)
*H04K 1/00* (2006.01)
*G06F 21/00* (2006.01)

(52) U.S. Cl. ............. 380/45; 380/255; 380/277; 705/51
(58) Field of Classification Search ........................ None
See application file for complete search history.

(56) References Cited

U.S. PATENT DOCUMENTS
5,987,124 A * 11/1999 Matyas et al. .................. 380/37
7,698,555 B2 * 4/2010 Jiang et al. ..................... 713/168
(Continued)

FOREIGN PATENT DOCUMENTS
EP 1465426 10/2004
(Continued)

OTHER PUBLICATIONS
Search Report Dated Feb. 7, 2008.

*Primary Examiner* — Nathan Flynn
*Assistant Examiner* — Trang Doan
(74) *Attorney, Agent, or Firm* — Myers Wolin, LLC (57) ABSTRACT

The present invention concerns a method and a device for encrypting an encoded scalable enhancement frame sent by an emitter to a receiver, the enhancement frame comprising a plurality of complementary streams ordered in term of quality level, each complementary stream corresponding to a combination of more than one scalability type, where a complementary stream of a lower quality level corresponds to a lower quality on each scalability type, comprising at the level of the emitter the steps of generating a key per complementary stream for encrypting said complementary stream in such a way that all scalability types can be either simultaneously or individually used, said keys being generated in such a way that only the keys of the complementary streams of quality levels lower than the quality level of a complementary stream can be obtained from the key of said complementary stream, and sending the key of a complementary stream corresponding to a required quality level to the receiver, the key permitting a receiver to generate the keys of the complementary streams of the lower quality levels only. The present invention also concerns a method and a device for decrypting a received encoded scalable enhancement frame.

9 Claims, 5 Drawing Sheets

U.S. PATENT DOCUMENTS

| | | | |
|---|---|---|---|
| 7,756,271 B2 * | 7/2010 | Zhu et al. | 380/200 |
| 2003/0039357 A1 * | 2/2003 | Alten | 380/46 |
| 2004/0196972 A1 * | 10/2004 | Zhu et al. | 380/45 |
| 2005/0182855 A1 | 8/2005 | Apostolopoulos et al. | |
| 2005/0276416 A1 * | 12/2005 | Zhu et al. | 380/210 |
| 2006/0153373 A1 * | 7/2006 | Mukherjee | 380/42 |
| 2006/0177061 A1 * | 8/2006 | Orsini et al. | 380/268 |

FOREIGN PATENT DOCUMENTS

| | | |
|---|---|---|
| EP | 1465427 | 10/2004 |

* cited by examiner

METHOD AND DEVICE FOR MANAGING A TRANSMISSION OF KEYS

This application claims the benefit, under 35 U.S.C. §365 of International Application PCT/EP2007/061934, filed Nov. 6, 2007, which was published in accordance with PCT Article 21(2) on May 15, 2008 in English and which claims the benefit of European patent application No. 06301141.5, filed Nov. 9, 2006.

The present invention relates to a method for managing a transmission of keys.

Fine Grain Scalability technique is defined in the MPEG4-part2 and MPEG2-part10 standards. It is noted hereafter MPEG-4 FGS. It defines a method where a data stream is compressed into two layers: a base layer, the non scalable part, and an enhancement layer, the scalable part. A receiver of the compressed stream may decode the base layer only or the base layer and the enhancement layer. If only the base layer is decoded, this results in low quality version of the original content. If a portion of the enhancement layer is decoded and combined with the base layer, this produces an improved quality of the content, proportional to the enhancement portion decoded. Furthermore, the enhancement layer supports Peak Signal to Noise Ratio scalability, noted PSNR, and temporal scalability. Thus, MPEG-4 FGS provides flexibility in supporting either temporal scalability by increasing only the bit-rate, or PSNR scalability while maintaining the same bit-rate, or both PSNR and temporal scalabilities. Fine grain scalability is offered by the enhancement layer. The Peak Signal to Noise Ratio is an objective video quality metric used to compare two pictures, which can be automatically computed by the receiver of a video. The bit-rate is the bit rate available at the receiver for receiving the video.

The Scalable Multi-Layer FGS Encryption, noted SMLFE, is a layered access control scheme that supports both PSNR and bit-rate scalabilities simultaneously for the MPEG-4 FGS coding. In the SMLFE, the enhancement layer is encrypted into a single stream with multiple quality levels divided according to PSNR and bit-rates values. Lower quality levels may be accessed and reused by a higher quality level of a same scalability type. The enhancement layer is then composed of several different segments. A key is generated per segment to encrypt each segment.

To access the MPEG-4 FGS compressed content a consumer needs the keys to decrypt all the required segments. The number of keys may be significant. Consequently, sending all the keys to the consumer may be cumbersome and add significant overhead to the content transmitted. It is then desirable to provide an efficient key management scheme.

The present invention concerns a method for managing the encryption keys and enabling a receiver to decrypt all the segments in the enhancement layer corresponding to the required quality while all other segments are still inaccessible to the consumer. It focuses on the key management system aiming at efficiently encrypt and decrypt complementary streams.

It applies notably to the field of MPEG4 FGS, but also more generally to other fields where encrypted encoded frames are transmitted.

To this end, the invention relates to a method for encrypting an encoded scalable enhancement frame sent by an emitter to a receiver, the enhancement frame comprising a plurality of complementary streams ordered in term of quality level, each complementary stream corresponding to a combination of more than one scalability type, where a complementary stream of a lower quality level corresponds to a lower quality on each scalability type, comprising at the level of the emitter the steps of generating a key per complementary stream for encrypting the complementary stream in such a way that all scalability types can be either simultaneously or individually used, said keys being generated in such a way that only the keys of the complementary streams of quality levels lower than the quality level of a complementary stream can be obtained from the key of said complementary stream, and sending the key of a complementary stream corresponding to a quality level to the receiver, the key permitting a receiver to generate the keys of the complementary streams of the lower quality levels only.

Desired features like high security, low complexity, and low data overhead are provided. Having high security for an encryption scheme and its related key management system is essential; however this is generally done at the expense of the complexity and the data overhead. A low complexity method is a method that uses as less keys as possible, short keys sizes and works even with limited computation power devices. Low data overhead means a method that does not add significant overhead with the scrambled streams. The key generation process permits to generate all the subsequent keys from one single key. The server only needs to send one key to the receiver so that the receiver deduces the permitted keys. This requires few data overhead.

According to an embodiment, prior to sending the key of a complementary stream corresponding to a quality level, the method comprises the step of receiving a request from a receiver for said quality level reception of the stream.

According to an embodiment, the step of generating a key per complementary stream comprises the steps of generating a random key of the complementary stream of the higher quality level, and getting the keys of the complementary streams of the lower quality levels by successively applying at least a one-way permutation algorithm to the random key.

A single function permits to generate all the subsequent keys. This requires few computational resources.

Particularly, in a combination of two scalability types, a first scalability and a second scalability, the step of getting the key of the complementary stream of a lower quality level for a given first scalability level, comprises the step of splitting the key of a level into a left part and a right part, applying the one-way permutation algorithm to the right part of the key, and concatenating the left part of the key with the obtained right part to get the key of the lower quality level.

Similarly, in a combination of two scalability types, a first scalability and a second scalability, the step of getting the key of the complementary stream of a lower quality level for a given second scalability level, comprises the step of splitting the key of a level into a left part and a right part, applying the one-way permutation algorithm to the left part of the key, and concatenating the obtained right part with the left part of the key to get the key of the lower quality level.

The invention also concerns a method for calculating decryption keys intended to decrypt an encoded scalable enhancement frame, the enhancement frame comprising a plurality of complementary streams ordered in term of quality level, each complementary stream corresponding to a combination of more than one scalability type, where a complementary stream of a lower quality level corresponds to a lower quality on each scalability type, comprising at the level of the receiver the steps of receiving the key of the complementary stream corresponding to a required quality level and generating, from the received key, the subsequent keys of the complementary streams corresponding to the lower quality levels only.

The receiver doesn't need to receive all the keys for all the complementary streams. It receives only one key that allows generating the authorized keys only.

According to an embodiment, the method comprises the step of receiving the key of the complementary stream, it comprises the step of indicating said required quality level reception of the stream.

According to an embodiment, the step of generating the subsequent keys comprises a step of successively applying a one-way permutation algorithm to the received key.

The invention also concerns a device for encrypting an encoded scalable enhancement frame comprising a plurality of complementary streams ordered in term of quality level, each complementary stream corresponding to a combination of more than one scalability type, where a complementary stream of a lower quality level corresponds to a lower quality on each scalability type, the device comprising encrypting means for generating a random key of the complementary stream of the higher quality level, for generating the keys of the complementary streams of the lower quality levels by successively applying at least a one-way permutation algorithm to the random key.

The invention also concerns a device for decrypting an encoded scalable enhancement frame comprising a plurality of complementary streams ordered in term of quality level, each complementary stream corresponding to a combination of more than one scalability type, where a complementary stream of a lower quality level corresponds to a lower quality on each scalability type, the device comprising decrypting means for generating, from a received key, the subsequent keys of the complementary streams corresponding to the lower quality levels only.

Another object of the invention is a computer program product comprising program code instructions for executing the steps of the processes according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way limitative, with reference to the appended figures on which.

Figure 5:
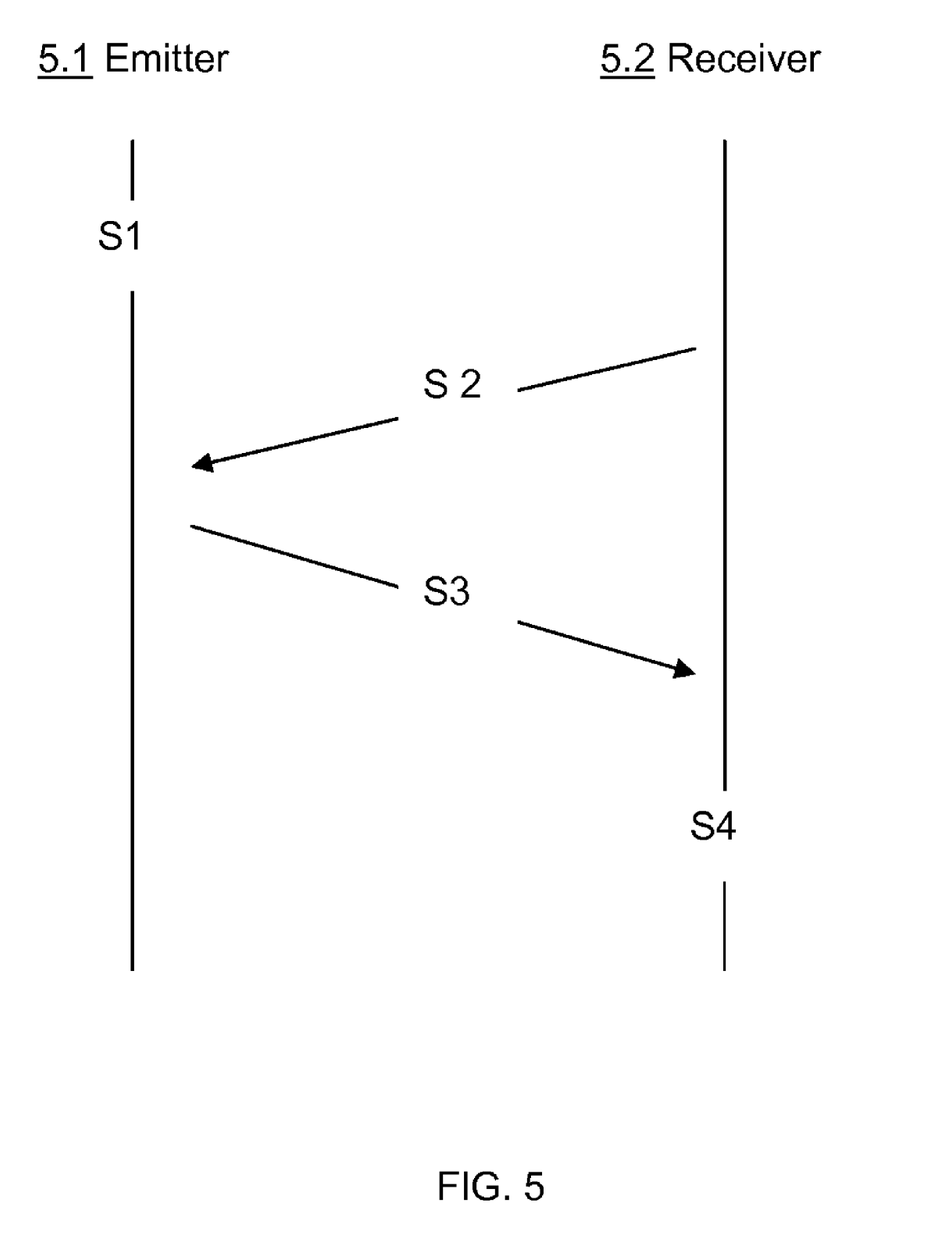
FIG. 5 is a flow chart of the method for encrypting and decrypting.

In FIG. 5, the represented blocks are purely functional entities, which do not necessarily correspond to physically separate entities. Namely, they could be developed in the form of software, or be implemented in one or several integrated circuits.

The exemplary embodiment comes within the framework of MPEG-4 FGS, but the invention is not limited to this particular environment and may be applied within other frameworks where a set of encrypted encoded frames are transmitted.

There are multiple ways of separating a digital service transmitted as diverse components; these components being transmitted by means of a client-particular stream. For example, it is possible to use incremental coders which code a service, or a component of the latter such as the video, in the form of a first stream of small bandwidth, called the base stream, and of complementary streams. The base stream is generally sufficient to allow the restitution of the service in a degraded transmission mode. It can always be decoded independently. As far as the video is concerned, this base service may contain a low-definition version of the video. The same is possible in respect to the audio. The complementary streams send the information missing from the base stream making it possible to restore the service in a non-degraded mode. A complementary stream can only be decoded together with the lower stream.

Figure 1:
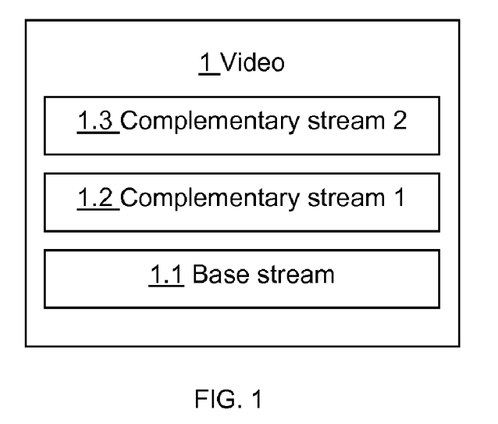
FIG. 1 represents a stream divided into a base stream and two complementary streams.

Such a service, or at least its video component, is represented in FIG. 1. The complete video 1 is decomposed into a first base stream 1.1, and a scalable enhancement layer, comprising two complementary streams referenced 1.2 and 1.3. The base stream makes it possible to reconstitute the video in a first low resolution. The decoding of the base stream and of the complementary stream 1 makes it possible to restore a video to an intermediate resolution. The decoding of the three streams makes it possible to restore the complete video in its best resolution.

Figure 2:
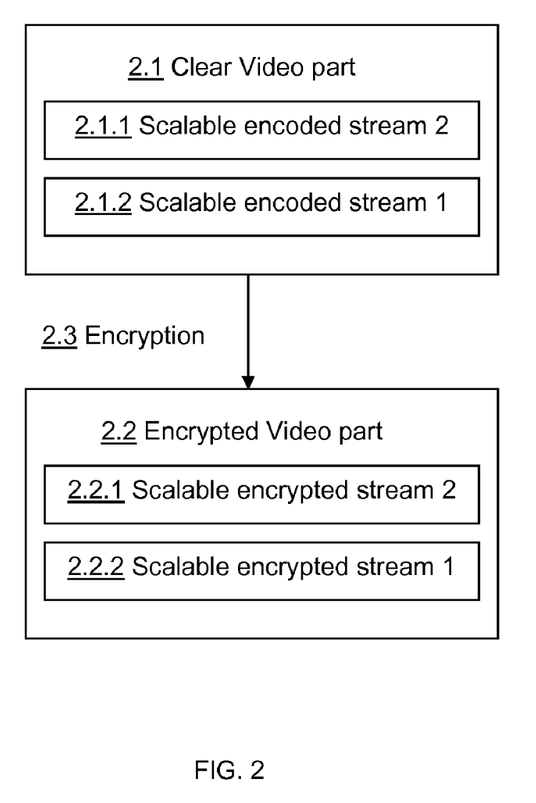
FIG. 2 shows the encryption of the scalable encoded complementary streams.

Indeed, complementary streams encoding is scalable whereas the base stream encoding is in general not scalable. In term of encryption, one key is sufficient to encrypt the base layer and a key management scheme is not needed for the base stream. Several keys are necessary to encrypt the complementary streams, and a key management scheme is usually needed. The encryption of the scalable encoded complementary streams is illustrated by the FIG. 2. The embodiment proposes a scheme that permits to encrypt scalable encoded complementary streams 2.1 into encrypted complementary streams 2.2 where these encrypted streams remain scalable. The encryption 2.3 is applied to the clear video part 2.1 to provide an encrypted video part.

Figure 3:
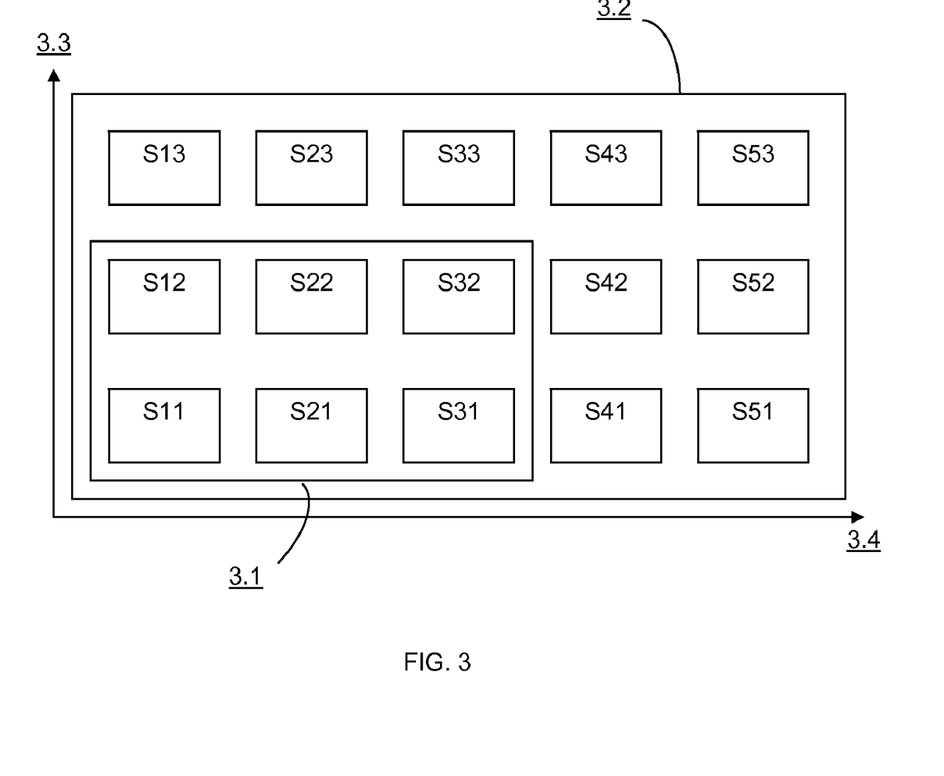
FIG. 3 is a block diagram that represents a scalable enhancement layer.

MPEG-4 FGS coding is defined in MPEG4-part2 ISO/IEC 14496-2:2003 standard. In FGS, data stream is encoded and compressed into two layers, a base layer, the non scalable part, and the enhancement layer, the scalable part. If only the base layer is decoded, this results into low quality version of the original content. If, however, a portion of the enhancement layer is decoded, combined with the base layer, this produces an improved quality of the content, proportional to the enhancement portion decoded. Furthermore, the enhancement layer supports both PSNR and temporal scalability. FIG. 3 is a block diagram that represents such a service, where the complete video is decomposed into a base layer not represented and the scalable enhancement layer 3.2, which comprises multiple complementary streams based on two scalabilities, the PNSR 3.3 and the bit-rate 3.4. Each enhancement layer is partitioned into T PSNR levels and M bit-rate levels independently. An enhancement layer is then composed of M*T different segments, or complementary streams. In FIG. 3, T=3 and M=5, and each segment $S_{m,t}$, where m belongs to $\{1, \ldots, M\}$ and t to $\{1, \ldots, T\}$, is at the intersection of one PSNR level and one bit-rate level.

Figure 4:
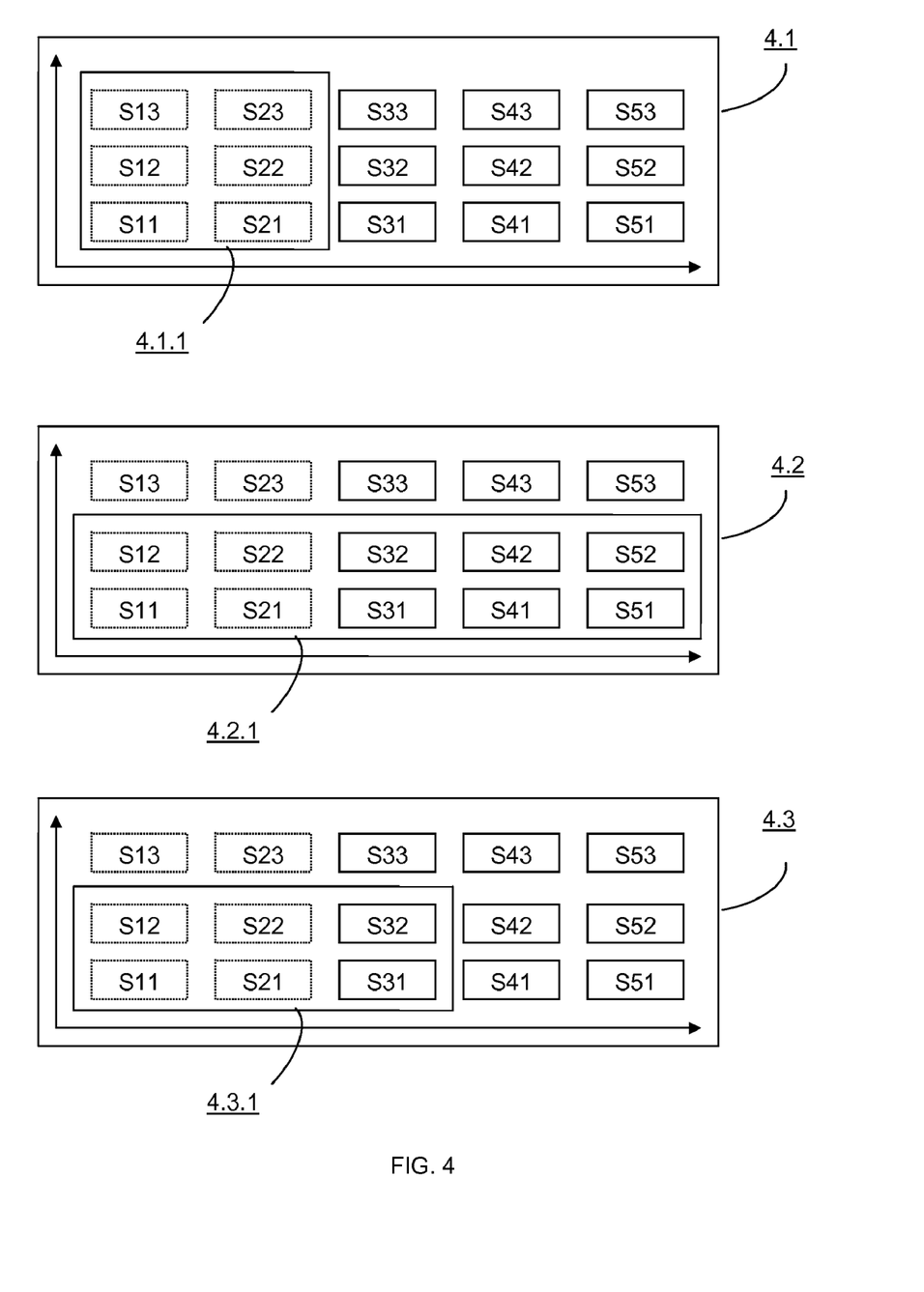
FIG. 4 illustrates the different modes to use scalability in the enhancement layer.

An MPEG-4 FGS content quality may depend on both temporal scalability bit-rate and PSNR scalability. For a requested quality, a content provider can give access to a certain level layer using bit-rate layers only, using PSNR layers only while maintaining the same level for the bit-rate or by using both PSNR and bit-rate layers simultaneously. So, there are three modes to get the same content quality. This is illustrated by the FIG. 4 which represent the same block diagram types as the one indicated in the FIG. 3. In 4.1 only the bit-rate scalability is used while maintaining the same level for the PSNR. In 4.2 only the PSNR scalability is used while maintaining the same level for the bit-rate. In 4.3 both scalabilities are used simultaneously. The use of both scalabilities permits to give access for a user to only some segments in a row or a column without necessarily giving access to all segments in that row or column. Indeed, the content provider can give access to the segments S1,1, S2,1, S3,1, S1,2, S2,2, S3,2 while keeping for example S4,1, S5,1, S4,2, S5,2 inaccessible for the consumer. In 4.1 and 4.2 when only one type of scalability is used, if the consumer has the right to access one segment in a layer of a given quality type, then he has the right to access all the segments in that layer. In 4.1 the consumer has the right to access the bit-rate of level 2, and consequently any segment in the layer with a bit-rate of level 2 and below, as indicated in 4.1.1. In 4.2 the consumer has the right to access the PSNR of level 2,s and consequently any segment in the layer with a PSNR of level 2 and below, as indicated in 4.2.1.

The encryption scheme of the embodiment permits to use these three modes to access encrypted enhancement layer. It permits to maintain the scalability with encrypted segments. It does not require decrypting any segment of the enhancement layer to be able to use the scalability. The key management is then flexible and the MPEG 4 FGS scalability can be fully exploited with the encrypted content. All scalability types can be either simultaneously or individually used.

The Scalable Multi-Layer FGS Encryption layered access control scheme, noted SMLFE, supports both PSNR and bit-rate scalabilities simultaneously for the MPEG-4 FGS coding. SMLFE is defined in the document C. Yuan, B. B. Zhu, M. Su, X. Wang, S. Li, and Y. Zhong, "Layered Access Control for MPEG-4 FGS Video," IEEE Int. Conf. Image Processing, Barcelona, Spain, September 2003, vol. 1, pp. 517-520. In SMLFE, the enhancement layer is encrypted into a single stream with multiple quality levels divided according to PSNR and bit-rates values. Lower quality levels may be accessed and reused by a higher quality level of the same scalability type, but not vice versa. The protection of the two different scalability types is orthogonal, i.e., a right to access a level of one scalability type does not make the levels of the other scalability type also accessible.

Each segment of the FIG. 3 is encrypted with a corresponding segment key, $K_{m,t}$, not represented. In such case, M*T keys are generated randomly to encrypt all the segments by the transmitter of the video. These keys have to be managed and sent to the receiver of the video to access the MPEG-4 FGS compressed content.

The method to encrypt and decrypt the segments as well as the method to generate the encryption keys according to the embodiment is now described. The encoding and encryption is performed at the server, or the transmitter. The decoding and decryption is performed at the client, or the receiver of the video.

As in the context of SMLFE, the enhancement layer is composed of M*T different segments. Each different key $K_{m,t}$ is used to encrypt a segment $S_{m,t}$ where m belongs to $\{1, \ldots, M\}$ and t to $\{1, \ldots, T\}$. $S_{M,T}$ is the segment of higher quality for both scalability types.

In the server, a key is first randomly generated. It corresponds to the key $K_{M,T}$ of the highest quality segment $S_{M,T}$. This key is split into two halves, a left side and a right side. Consequently, the key associated to a lower PSNR quality segment is obtained by concatenating the left side of the key $K_{M,T}$ with the result of right side of the key $K_{M,T}$ through a one-way permutation. And, the key associated to a lower bit-rate quality segment is obtained by concatenating the result of the left side key $K_{M,T}$ through a one-way permutation, with the right side key $K_{M,T}$. By repeating the process in the same way, until computing $K_{1,1}$ the encryption key of the lowest quality segment $S_{1,1}$, all the keys $K_{m,t}$ for $m=1, \ldots, M$ and $t=1, \ldots, T$ are thus obtained.

Explicitly, let h be a one-way permutation. Given a key K, $h^n(K)$ denotes the result after applying n times the one-way permutation h to K. Let $K_{m,t}$ the encryption key of a given segment $S_{m,t}$ in the enhancement layer, that key is generated respecting the following procedure:

Generate randomly $K_{M,T} = (LK_{M,T} \| RK_{M,T})$ where $LK_{M,T}$ represents left side key value, $RK_{M,T}$ the right side key value and symbol $\|$ represents the concatenation.

Compute the differences M−m=x, and T−t=y.

Produce the keys $K_{m,t}$ using the following key generation equation: $K_{m,t} = (h^x(LK_{M,T}) \| h^y(RK_{M,T}))$ In the embodiment, the keys $K_{m,t}$ are 128-bit long, with $h^x(LK_{M,T})$ and $h^y(RK_{M,T})$ being 64-bit long.

To avoid having the same segment key for different segments, the right half value of $K_{M,T}$ shall be different from the left half value. Otherwise the key $K_{M,T}$ is regenerated until getting a well suited key.

Back on the segments indicated in the FIG. 3, $S_{5,3}$ is the segment of the highest quality for both PSNR and bit-rate scalabilities.

First, the associated segment key $K_{5,3}$ is randomly generated.

Next, this key is split into two halves $K_{5,3} = (LK_{5,3} \| RK_{5,3})$ and processed using a one-way permutation h, to get all other keys.

Table 1 shows how all other segment keys obtained with key generation equation defined above.

TABLE 1

| Level | t = 1 | t = 2 | t = 3 |
|---|---|---|---|
| m = 1 | $K_{1,1} = (h^4(L_{K5,3}) \| h^2(R_{K5,3}))$ | $K_{1,2} = (h^4(L_{K5,3}) \| h(R_{K5,3}))$ | $K_{1,3} = (h^4(L_{K5,3}) \| R_{K5,3})$ |
| m = 2 | $K_{2,1} = (h^3(L_{K5,3}) \| h^2(R_{K5,3}))$ | $K_{2,2} = (h^3(L_{K5,3}) \| h(R_{K5,3}))$ | $K_{2,3} = (h^3(L_{K5,3}) \| R_{K5,3})$ |
| m = 3 | $K_{3,1} = (h^2(L_{K5,3}) \| h^2(R_{K5,3}))$ | $K_{3,2} = (h^2(L_{K5,3}) \| h(R_{K5,3}))$ | $K_{3,3} = (h^2(L_{K5,3}) \| R_{K5,3})$ |
| m = 4 | $K_{4,1} = (h(L_{K5,3}) \| h^2(R_{K5,3}))$ | $K_{4,2} = (h(L_{K5,3}) \| h(R_{K5,3}))$ | $K_{4,3} = (h(L_{K5,3}) \| R_{K5,3})$ |
| m = 5 | $K_{5,1} = (L_{K5,3} \| h^2(R_{K5,3}))$ | $K_{5,2} = (L_{K5,3} \| h(R_{K5,3}))$ | $K_{5,3} = (L_{K5,3} \| R_{K5,3})$ |

When a receiver acquires rights for content with a certain quality, the key associated to the highest quality segment of the requested quality, is computed by the transmitter and sent to the receiver. Let consider that this highest quality segment is $S_{3,2}$ with $K_{3,2}$ its associated key. Differences M−m=5−3 and T−t=3−2 are equal respectively to 2 and 1. $K_{3,2} = (h^2(LK_{5,3}) \| h(RK_{5,3}))$ is the segment key computed from $K_{5,3}$ by the transmitter using the key generation equation defined above and a one-way permutation algorithm. $K_{3,2}$ is sent to the receiver. At the receiver, accessible segments are $S_{3,2}$, $S_{3,1}$, $S_{2,2}$, $S_{2,1}$, $S_{1,2}$ and $S_{1,1}$, as indicated in 3.1 in the FIG. 3. Namely, if the highest quality segment is $S_{m,t}$, the accessible segments are $S_{u,v}$, where $1 \leq u \leq m$ and $1 \leq v \leq t$.

$K_{3,2}$ is received by the receiver and is split in two halves $LK_{3,2}$ and $RK_{3,2}$. Segment keys $K_{3,1}$, $K_{2,2}$, $K_{2,1}$, $K_{1,2}$ and $K_{1,1}$ are then obtained by hashing and concatenating $LK_{3,2}$ and $RK_{3,2}$. This is done using the same one-way permutation algorithm as the one used by the transmitter. The process is repeated until computing all the segment keys. The computed keys are obtained from $K_{3,2}$ as indicated in table 2.

TABLE 2

| Level | t = 1 | t = 2 |
|---|---|---|
| m = 1 | $K_{1,1}$ = (h($LK_{2,2}$) ‖ h($RK_{2,2}$)) = ($h^2(LK_{3,2})$ ‖ h($RK_{3,2}$)) | $K_{1,2}$ = (h($LK_{2,2}$) ‖ $RK_{2,2}$) = ($h^2(LK_{3,2})$ ‖ h($RK_{3,2}$)) |
| m = 2 | $K_{2,1}$ = (h($LK_{3,2}$) ‖ h($RK_{3,2}$)) | $K_{2,2}$ = (h($LK_{3,2}$) ‖ $RK_{3,2}$) |
| m = 3 | $K_{3,1}$ = ($LK_{3,2}$ ‖ h($RK_{3,2}$)) | $K_{3,2}$ |

A right to access a quality level provides also the right to access lower quality levels for the different PSNR or bit-rate scalabilities by hashing respectively right or left side of the segment key. Thanks to one-way criterion of the hash function, and the fact that a hash function is not injective, higher quality levels are not accessible. If the highest quality segment is $S_{m,t}$, the segments $S_{u,v}$, where m<u or t<v. The security of the key management scheme relies essentially on the choice and robustness of the hash function.

The method for encrypting and decrypting is summarized in the FIG. 5.

Step S1. The server generates a random key, and subsequent keys from the random key.

Step S2. The receiver sends a request for the reception of the content at a quality level. The server receives the request and deduces the matching segment of the highest quality.

Step S3. The server sends the key corresponding to the matching segment of the highest quality to the receiver.

Step S4. The receiver receives the key and generates the keys corresponding to the accessible segments.

As described above, a unique one-way permutation function is used on each side. Instead a different one-way permutation may be used for the right side and for the left side. The equation for key generation would then be, with h1 and h2 functions: $K_{m,t} = (h1^x(LK_{M,T}) ‖ h2^y(RK_{M,T}))$.

In the embodiment, $K_{M,T}$ is obtained with the concatenation of $LK_{M,T}$ and $RK_{M,T}$, where $LK_{M,T}$ represents the left side key value, $RK_{M,T}$ the right side key value. Alternatively, $LK_{M,T}$ could represent the even bits and $RK_{M,T}$ the odd bits of $LK_{M,T}$.

A one-way permutation is a function that is much easier to compute in one direction than in the inverse direction; i.e. if an output is obtained with a one-way permutation on an input, it is uneasy to get the input back given the output. It might be possible, for example, to compute the function in the forward direction in seconds but to compute its inverse could take months or years, if at all possible. Various one-way permutation algorithms that can be used:

Hash functions well known in the art, like MD5, RIPEMD-160 or SHA1.

Pseudo Random Number generators, noted PRNG, well know in the art, like Mersenne Twister, ISAAC . . . A segment key, or the piece of the segment key, is used as a seed for the PRNG, h(K)=PRNG (K). The output may be truncated to fit a predefined size.

Symmetric ciphers: block cipher or stream cipher, like DES or RC4. Symmetric ciphers require two inputs, a message and key, but when used as a one-way permutation the two inputs may be identical. In our invention, when a symmetric cipher is applied to a segment key K, K is used as both, the message to encrypt and the key used for encryption. In that case $h(K)=E_{\{K\}}(K)$.

Discrete Logarithm or public-key encryption algorithm RSA:

Concerning discrete Logarithm, a generator g of a multiplicative group $Z^*_p$ is chosen, where p is a large prime number. A segment key associated to a lower quality segment is obtained by exponentiation of g (modulo p) with the value of the higher quality segment key. In that case $h(K)=g^K$ mod p.

Concerning RSA, public values (e, n) are generated, where n is product of two prime numbers and e the public exponent (the private key is discarded). A segment key associated to a lower quality segment is obtained by exponentiation of the value of the higher quality segment key K by the public exponent e (modulo n). In that case $h(K)=K^e$ mod n.

The needed property for the permutation is only the one-way criterion. The fact that some collisions exist, as for MD5 for example, has no consequences on the security.

The embodiment relates to an enhancement layer that supports both PSNR and bit-rate scalabilities. It is indeed applicable to more than two scalabilities. With N scalabilities the transmitted key $K_{M,T}$ is split into N parts, and subsequent keys are generated using a one-way permutation on each part successively.

Figure 6:
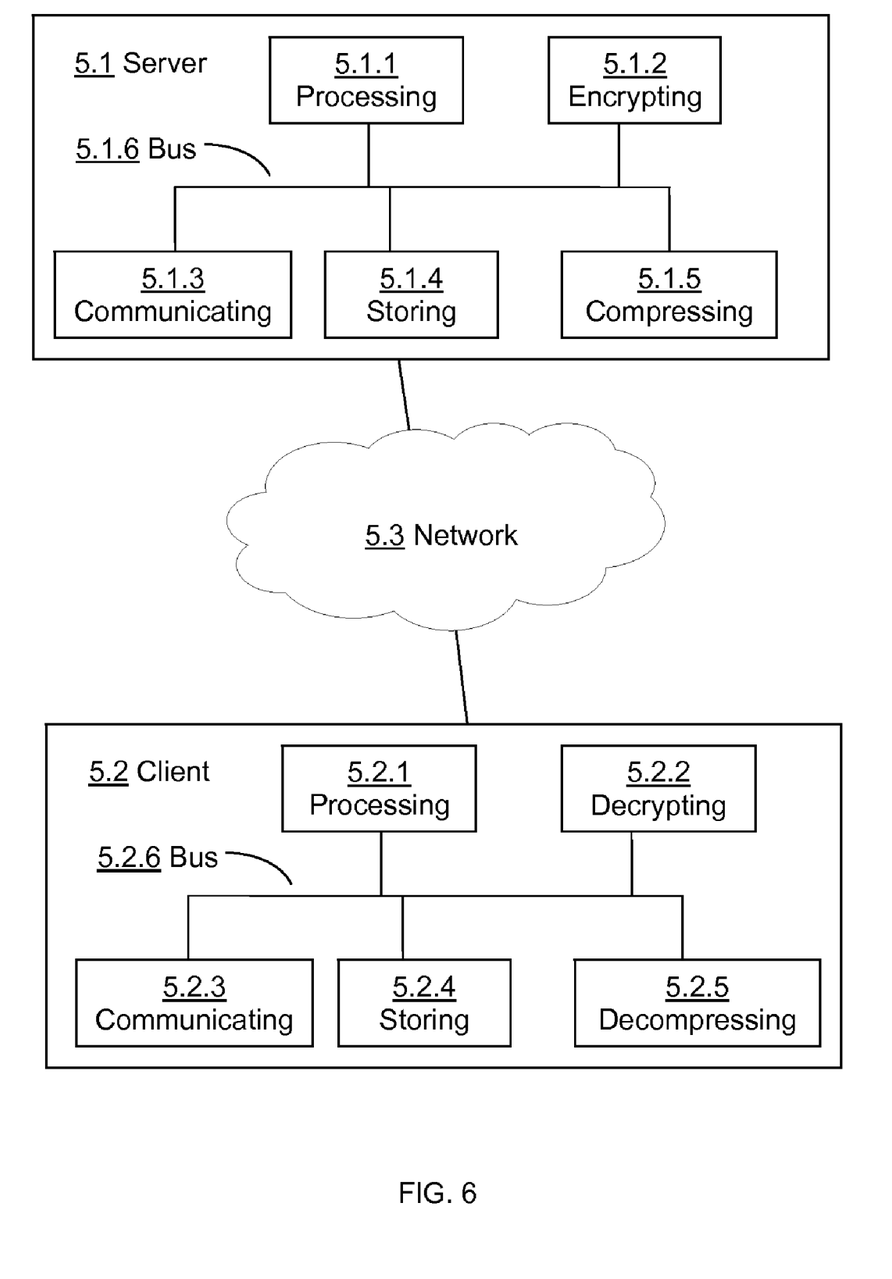
FIG. 6 represents the system of the embodiment.

FIG. 6 represents the system of the embodiment, comprising a server 5.1, also called a sender, a client 5.2, also called a receiver, connected to the server through a network 5.3. The server sends the encrypted video content to the client. The network is for example the Internet. The server is the transmitter of the video. The client is the receiver of the video.

The server comprises compressing means 5.1.5 for compressing the stream and generating the base layer and the subsequent enhancement layers according to the embodiment. It also comprises encrypting 5.1.2 means for generating encryption keys according to the embodiment and encrypting the segments. It comprises communicating means 5.1.3 for sending the stream through the network to the clients. The server comprises processing means 5.1.1 and storing means 5.1.4 for storing programs that run compression algorithms and encryption algorithms. The server comprises an internal bus 5.1.6 for transmitting the data internally.

The client comprises decompressing means 5.2.5 for decompressing the stream. It comprises decrypting means 5.2.2 for generating the encryption keys according to the embodiment and decrypting the encrypted segments. It comprises communicating means 5.2.3 for receiving the stream from the server through the network. The server comprises processing means 5.2.1 and storing means 5.2.4 for storing programs that run decompression algorithms and decryption algorithms. The client comprises an internal bus 5.2.6 for transmitting the data internally.

The invention claimed is:

1. A method for encrypting an encoded scalable enhancement frame sent by a sender device via its communicating means to a receiver device over a communications network, said encoded scalable enhancement frame comprising a plurality of complementary streams ordered in term of quality level, each complementary stream corresponding to a combination of more than one scalability type, where a complementary stream of a lower quality level corresponds to a lower quality on each scalability type, said method comprising:

generating, by the sender device, one random key corresponding to a key of the complementary stream of the higher quality level;

getting, by the sender device, keys of the complementary streams of the lower quality levels by successively applying a one-way function to the random key, where the one-way function output is different for each scalability type; and sending, by the sender device, a key of a complementary stream corresponding to a quality level to the receiver device, said key permitting a receiver device to generate the keys of the complementary streams of the lower quality levels only, wherein in the getting the key, the random key ($K_{M,T}$) is slit into a number of part ($L_{KM,T}$, $R_{KM,T}$) corresponding to the number of scalability types, and a subsequent key ($K_{M-I,\ T-J}$) is generated using the one-way function on each part successively ($h_{M-I}(L_{KM,T})|h^{T-J}(R_{KM,T})$).

2. The method according to claim 1, wherein prior to sending the key of a complementary stream corresponding to a quality level, the method comprises receiving a request from a receiver device for said quality level reception of the stream.

3. The method according to claim 1, wherein, in a combination of two scalability types, a first scalability and a second scalability, the getting the key of the complementary stream of a lower quality level for a given first scalability level, comprises:
   splitting the key of a level into a left part and a right part,
   applying the one-way function to the right part of the key, and
   concatenating the left part of the key with the obtained right part to get the key of the lower quality level.

4. The method according to claim 1, wherein, in a combination of two scalability types, a first scalability and a second scalability, the getting the key of the complementary stream of a lower quality level for a given second scalability level, comprises:
   splitting the key of a level into a left part and a right part,
   applying the one-way function to the left part of the key, and
   concatenating the obtained right part with the left part of the key to get the key of the lower quality level.

5. The method according to claim 1, wherein a different one-way function is used for each scalability type.

6. A method for calculating decryption keys intended to decrypt an encoded scalable enhancement frame received by a receiver device via its communicating means from a sender device over a communications network, said enhancement frame comprising a plurality of complementary streams ordered in term of quality level, each complementary stream corresponding to a combination of more than one scalability type, where a complementary stream of a lower quality level corresponds to a lower quality on each scalability type, said method comprising:
   receiving, by the receiver device, a key ($K_{m,t}$) of the complementary stream corresponding to a required quality level ($S_{m,t}$); and
   generating, by the receiver device, from the received key, the subsequent keys of the complementary streams corresponding to the lower quality levels only by successively applying a one-way function to the received key, where the one-way function output is different for each scalability type,
   wherein the random key ($K_{m,t}$) is split into a number of part ($L_{KM,T}$, $R_{KM,T}$) corresponding to the number of scalability types, and a subsequent key ($K_{M-I,\ T-J}$) is generated using the one-way function on each part successively ($h^{M-I}(L_{KM,T})|h^{T-J}(R_{KM,T})$).

7. The method according to claim 6, wherein at prior to the receiving the key of the complementary stream, the method further comprises indicating said required quality level reception of the stream.

8. A device for encrypting an encoded scalable enhancement frame comprising a plurality of complementary streams ordered in term of quality level, each complementary stream corresponding to a combination of more than one scalability type, where a complementary stream of a lower quality level corresponds to a lower quality on each scalability type, said device comprising encrypting means for generating one random key ($K_{M,T}$) corresponding to a key of the complementary stream of the higher quality level ($S_{M,T}$), for generating keys of the complementary streams of the lower quality levels by successively applying a one-way function to the random key ($K_{M,T}$), where the one-way function output is different for each scalability type, and communicating means for sending a key of a complementary stream corresponding to a quality level to a receiver device over a communications network,
   wherein the random key ($K_{M,T}$) is split into a number of part ($L_{KM,T}$, $R_{KM,T}$) corresponding to the number of scalability types, and a subsequent key ($K_{M-I,\ T-J}$) is generated using the one-way function on each part successively ($h^{M-I}(L_{KM,T})|h^{T-J}(R_{KM,T})$).

9. A device for decrypting an encoded scalable enhancement frame comprising a plurality of complementary streams ordered in term of quality level, each complementary stream corresponding to a combination of more than one scalability type, where a complementary stream of a lower quality level corresponds to a lower quality on each scalability type, said device comprising decrypting means for generating, from a received key ($K_{m,t}$), subsequent keys of the complementary streams corresponding to the lower quality levels only by successively applying a one-way function (h) to the received key, where the one-way function output is different for each scalability type, and communicating means for receiving a key over a communications network,
   wherein the received key ($K_{m,t}$) is split into a number of part ($L_{KM,T}$, $R_{KM,T}$) corresponding to the number of scalability types, and a subsequent key ($K_{M-I,\ T-J}$) is generated using the one-way function on each part successively ($h^{M-I}(L_{KM,T})|h^{T-J}(R_{KM,T})$).

* * * * *